Sept. 19, 1950          L. P. WELCH          2,522,697
GAS PRESSURE OPERATED VALVE AND SWITCH
Filed May 17, 1949
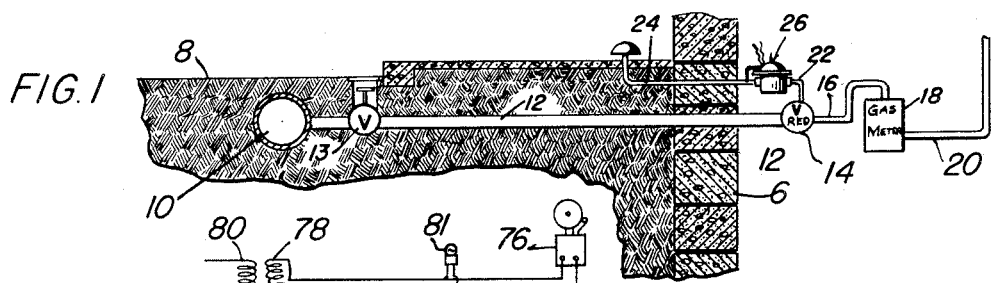
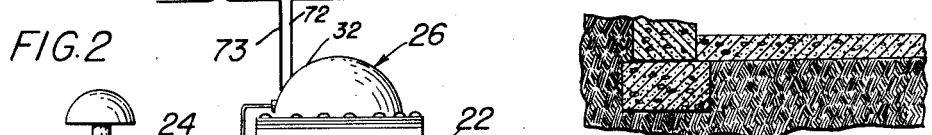
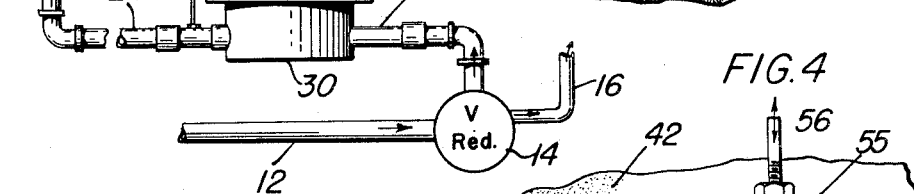
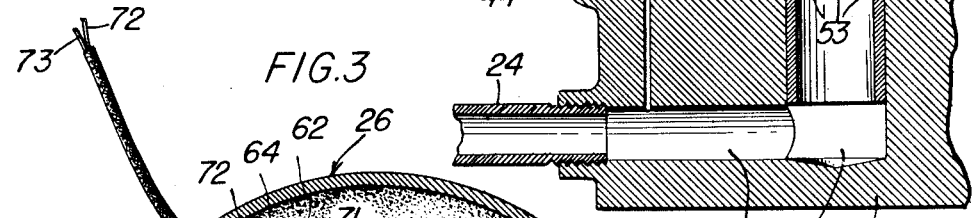
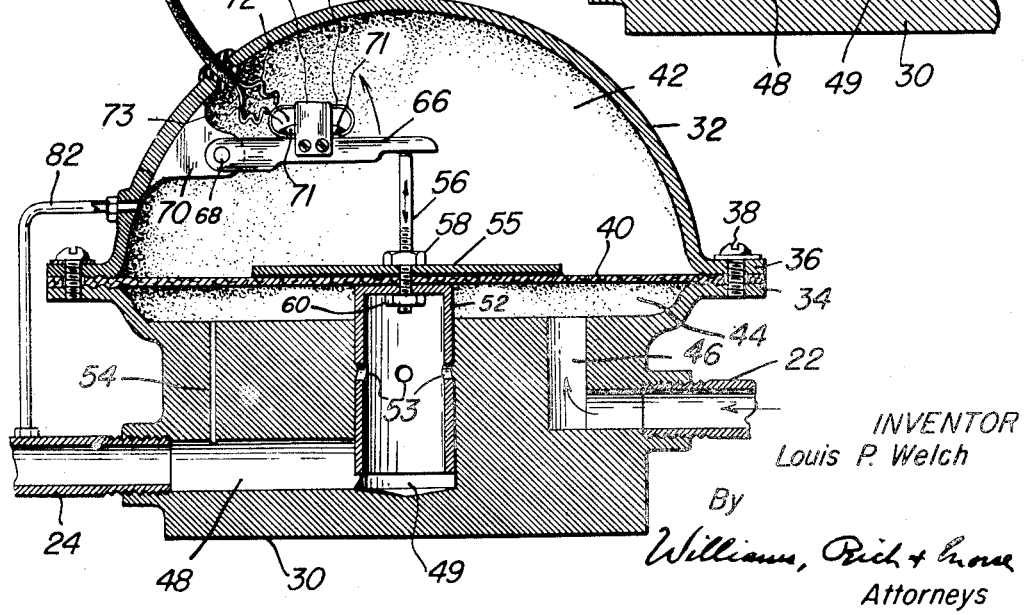
INVENTOR
Louis P. Welch
By Williams, Rich & Morse
Attorneys Patented Sept. 19, 1950

2,522,697

UNITED STATES PATENT OFFICE 2,522,697

GAS PRESSURE OPERATED VALVE AND SWITCH

Louis P. Welch, Cambria Heights, N. Y., assignor of one-half to Louis J. Schlaefer, Brooklyn, N. Y.

Application May 17, 1949, Serial No. 93,672

6 Claims. (Cl. 200—53)

This invention relates to gas distributing systems for buildings which are supplied from a high-pressure gas main. In such systems, the gas in the main may be at a pressure of 65 to 70 pounds per square inch, and the gas is supplied to the building system through a pressure reducing device which reduces the pressure to perhaps as low as one-quarter pound per square inch. In order to insure that gas is not supplied to the building at high pressure, if the pressure reducing device becomes defective as sometimes happens, a vent pipe leading to a point out-of-doors is customarily connected to the casing of the reducing device; and the odor of gas escaping from this vent pipe is relied upon to indicate that the pressure reducing device has become defective and is in need of attention. However, it often happens that a delay occurs in notifying the gas company, or the latter's inspector may have difficulty in ascertaining the location of the building containing the defective pressure reducing device. Moreover, there is danger of fire or an explosion due to such escaping gas.

The general object of the present invention is to provide an alarm, for example by the lighting of an electric lamp or the ringing of a bell, when gas is escaping from a vent pipe connected to a pressure reducing device. This enables the defective pressure reducing device to be easily and quickly located.

The invention will be understood from the following description, taken in connection with the accompanying drawing in which an embodiment of the invention is illustrated, and in which Fig. 1 is an elevation, partly in section, illustrating a gas distributing system including the invention; Fig. 2 is an elevation of that portion of the system which includes the alarm switch; Fig. 3 is a sectional elevation of the alarm switch in its normal position; and Fig. 4 is a fragmentary sectional elevation of the pressure-actuating portion of the alarm switch in the position which it assumes when it is actuated by an escape of gas from a defective pressure reducing device.

Referring to Figs. 1 and 2, the foundation wall of a building to be supplied with gas is indicated at 6, and the high-pressure gas main buried in the street 8 is indicated at 10. A service pipe 12, provided with the usual shut-off valve 13, is shown connected to the high-pressure main 10 and extending through the wall 6 of the building. As is customary, the service pipe 12 is connected to a pressure reducing device 14 which reduces the pressure of the gas supplied to the building to the desired low-pressure such as one-quarter pound per square inch. Low-pressure gas from the pressure reducing valve 14 passes through a pipe 16 to the gas-meter 18, and from the meter to the pipe 20 which supplies gas to the building. As has been mentioned, it is usual to provide a vent pipe connected to the casing of the pressure reducing device 14 and leading out-of-doors so that, if the pressure reducing device becomes defective, high-pressure gas will escape through this vent pipe instead of flowing to the meter. In Figs. 1 and 2, the vent pipe connected to the pressure reducing device is indicated at 22 and 24 as having interposed in it an alarm switch device 26, the construction of which is shown in Figs. 3 and 4, with the aid of which the alarm switch and its mode of operation will now be described.

It will be evident from Figs. 3 and 4 that the alarm switch device 26 has a base portion 30 and a cover portion 32 which are provided respectively with cooperating flanges 34 and 36. Screws 38, which pass freely through the flange 36 and engage threaded holes in the flange 34, serve to clamp tightly between the flanges 34 and 36 the edge of a flexible diaphragm 40 of any suitable material. The diaphragm 40 divides the interior of the casing into an upper or outer chamber 42 and a lower or inner chamber 44. Communicating with the lower or inner chamber 44 is an inlet passage 46 with which the portion 22 of the vent pipe leading from the pressure reducing valve 14 is connected; and the base 30 is also provided with an outlet passage 48 which communicates with the portion 24 of the vent pipe which extends out-of-doors. The base 30 is provided with a central hole 49 serving as a valve passage extending from the lower or inner chamber 44 to the outlet passage 48; and located in this hole 49, and capable of free longitudinal movement therein, is a valve member 52 in the form of a hollow cylinder closed at its upper end and open at its bottom end and provided with one or more holes 53 as shown. It will also be noted that the lower or inner chamber 44 is permanently connected to the outlet passage 48 by a breather passage 54 of small cross-sectional area, which serves a purpose hereinafter explained. Of course, instead of the passage 54 a passage or passages of small cross-sectional area may be provided near the top of the cylindrical portion of the valve member 52. The valve member 52 is shown in Fig. 3 in its normal position with the holes 53 below the bottom of the lower chamber 44. Fig. 4 shows the valve member 52 in the position to which it is moved when the diaphragm 40 is flexed upwardly (as hereinafter described) by the pressure of gas entering the lower chamber 44 through the inlet passage 46; and it will be noted that the holes 53 in the valve member 52 are then in such a position that gas may flow through them from the lower chamber 44 into the inside of the valve member 52 and to the outlet passage 48.

As shown in Figs. 3 and 4, the valve member 52 is secured in engagement with the bottom side of the diaphragm 40, and a disc 55 is secured in engagement with the top side of the diaphragm 40, by means of a threaded rod 56 which passes freely through central holes in the disc 55, in the diaphragm 40 and in the closed end of the valve member 52. The rod 56 is provided with nuts 58 and 60 between which the disc 55, diaphragm 40 and the closed end of the valve member 52 are clamped. At its upper end, the rod 56 cooperates with an electric switch (of any suitable form) located in the upper or outer chamber 42, which is open when the diaphragm 40 and its associated parts are in the position shown in Fig. 3, and is closed when the diaphragm 40 and its associated parts are in the position shown in Fig. 4. The particular switch illustrated in Fig. 3 is a mercury switch of a well-known type having a glass or metal casing 62 which is secured by a strap 64 to the top of a lever 66 which is pivoted at 68 on a lug or lugs 70 extending inwardly from the casing section 32. As will be obvious from Fig. 3, the rod 56 cooperates at its upper end with the lever 66 and serves, when the diaphragm 40 is flexed to the position shown in Fig. 4, to move the lever 66 in a counter-clockwise direction, with the result that the mercury 71 within the switch casing 62 is caused to flow to the left end of the switch casing where it engages and electrically connects the ends of wires 72 and 73 which extend into the switch casing 62.

As will be obvious from Figs. 2 and 3, the bridging by the mercury 71 of the ends of the wires 72 and 73 results in closing a circuit through an alarm bell 76 which is supplied with current from an electrical source such as a transformer having a secondary coil 78 connected in series with the bell 76 and a primary coil 80 connected to a source of alternating current in the building where the alarm switch 26 and the alarm bell 76 are located. An electric red lamp 81 may, if desired, also be connected to the wires 72 and 73, so as to provide a visual as well as an audible indication. As shown in Fig. 3, the upper or outer chamber 42 is permanently connected by a pipe 82 with the vent pipe 24, so that in case gas leaks into the upper chamber 42 for any reason it will be allowed to escape through the pipe 82 and the vent pipe 24. The purpose of the passage 54, of small cross-sectional area, connecting the lower chamber 44 with the outlet passage 48 is to provide a breather for the gas reducing valve 14, this valve being so constructed as to require a breather which is ordinarily provided by its connection with the open vent pipe which exists in the absence of the diaphragm actuated switch which is inserted therein in accordance with the invention.

The manner in which the alarm device operates to actuate the alarm bell 76 and light the lamp 81 will now be described. Under normal conditions, the parts of the alarm device 26 are in the positions represented in Fig. 3. If the pressure reducing device 14 becomes defective, with the result that high-pressure gas passes through the pipe 22 and the inlet passage 46 into the lower or inner chamber 44, the diaphragm 40 will be flexed to the position shown in Fig. 4 until the valve member 52 moves upwardly sufficiently to permit the escape of enough of the gas flowing into the lower or inner chamber 44 to maintain the pressure in that chamber sufficient merely to hold the diaphragm 40 in its flexed position. The gas flowing through the holes 53 into the valve member 52 passes out through the outlet passage 48 and the vent pipe 24. When the diaphragm 40 is flexed as just described, the upward movement of the rod 56 moves the lever 66 in a counter-clockwise direction and tilts the mercury switch thereby causing the mercury 71 within it to bridge the wires 72 and 73, as has been described. Thus, current is supplied to the alarm bell 76 and to the lamp 81. Thus, the invention provides an audible and/or visual alarm which will indicate that high-pressure gas is escaping from the particular building in which a defective pressure reducing device 14 is located. Therefore, it is probable that the gas company will be promptly notified of the need for repairs and of the location of the building where repairs are required.

What is claimed is:

1. An alarm device, adapted to be interposed in a vent pipe and responsive only when high-pressure gas is supplied thereto, comprising a casing containing a diaphragm dividing the interior of said casing into upper and lower chambers, said casing being provided with inlet and outlet passages both communicating with the lower chamber, a valve member connected to said diaphragm and normally closing said outlet passage but opening it when said diaphragm is flexed by the pressure of gas entering the lower chamber through said inlet passage, a normally-open alarm-switch located in said upper chamber, and actuating means cooperating with said diaphragm and said switch whereby the latter is closed when said diaphragm is flexed by high pressure gas in the lower chamber, said upper chamber being provided with a vent communicating with said outlet passage.

2. An alarm device, adapted to be interposed in a vent pipe and responsive only when high-pressure gas is supplied thereto, comprising a casing containing a diaphragm dividing the interior of said casing into upper and lower chambers, said casing being provided with inlet and outlet passages both communicating with the lower chamber, a valve member connected to said diaphragm and normally closing said outlet passage but opening it when said diaphragm is flexed by the pressure of gas entering the lower chamber through said inlet passage, a normally-open alarm-switch located in said upper chamber, and actuating means cooperating with said diaphragm and said switch whereby the latter is closed when said diaphragm is flexed by high pressure gas in the lower chamber, said lower chamber being provided with a passage having small cross-sectional area communicating with said outlet passage.

3. An alarm device, adapted to be interposed in a vent pipe and responsive only when high-pressure gas is supplied thereto, comprising a casing containing a diaphragm dividing the interior of said casing into upper and lower chambers, said casing being provided with inlet and outlet passages both communicating with the lower chamber, a valve member connected to said diaphragm and normally closing said outlet passage but opening it when said diaphragm is flexed by the pressure of gas entering the lower chamber through said inlet passage, a normally-open alarm-switch located in said upper chamber, and actuating means cooperating with said diaphragm and said switch whereby the latter is closed when said diaphragm is flexed by high pressure gas in the lower chamber, said upper chamber being provided with a vent communicating with said outlet passage, and said lower chamber being provided with a passage having small cross-sectional area communicating with said outlet passage.

4. An alarm device, adapted to be interposed in a vent pipe and responsive only when high-pressure gas is supplied thereto, comprising a casing having inlet and outlet passages permanently connected to one another through a breather passage of small cross-sectional area, a diaphragm supported within said casing and providing between the casing and the diaphragm a chamber to which said inlet passage is permanently connected and from which chamber extends a valve passage communicating with said outlet passage, a valve member connected to and movable with said diaphragm and cooperating with and normally closing said valve passage but permitting a restricted flow of gas from said chamber to said outlet passage when high-pressure gas enters said chamber and flexes said diaphragm, and a normally-open alarm switch cooperating with said diaphragm and closed when the latter is in its flexed condition due to high-pressure gas entering said chamber.

5. An alarm device adapted to be interposed in a vent pipe and responsive only when high-pressure gas is supplied thereto, a casing having inlet and outlet passages permanently connected to one another through a breather passage of small cross-sectional area, said casing having within it a chamber permanently connected to said inlet passage and to a valve passage communicating with said outlet passage, a diaphragm supported by said casing and forming a wall of said chamber, a hollow valve member connected to and movable with said diaphragm and slidable in said valve passage and having at least one port normally closed by the wall of said valve passage and opened when said valve member is moved by the flexing of said diaphragm, thereby permitting a restricted flow of gas from said chamber to said outlet passage when high-pressure gas enters said chamber and flexes said diaphragm, and a normally-open alarm switch cooperating with said diaphragm and closed when the latter is in its flexed condition due to high-pressure gas entering said chamber.

6. An alarm device adapted to be interposed in a vent pipe and responsive only when high pressure gas is supplied thereto, a casing containing a diaphragm dividing the interior of said casing into outer and inner chambers, said casing having inlet and outlet passages permanently connected to one another through a breather passage of small cross-sectional area, and said inlet passage being permanently connected to said inner chamber, said casing having within it a valve passage communicating with said inner chamber and said outlet passage, a hollow valve member connected to and movable with said diaphragm and slidable in said valve passage and having at least one port normally closed by the wall of said valve passage and opened when said valve member is moved by the flexing of said diaphragm, thereby permitting a restricted flow of gas from said inner chamber to said outlet passage when high pressure gas enters said inner chamber and flexes said diaphragm, and a normally-open alarm switch located in said outer chamber and cooperating with said diaphragm and closed when the latter is in its flexed condition due to high pressure gas entering said inner chamber.

LOUIS P. WELCH.

REFERENCES CITED

The following references are of record in the file of this patent:

UNITED STATES PATENTS

| Number | Name | Date |
| --- | --- | --- |
| 378,283 | Brick | Feb. 21, 1888 |
| 423,385 | Miesse | Mar. 11, 1890 |
| 1,636,919 | Miller | July 26, 1927 |
| 1,768,602 | Hull | July 1, 1930 |
| 2,297,917 | Schmidt | Oct. 6, 1942 |

FOREIGN PATENTS

| Number | Country | Date |
| --- | --- | --- |
| 5,301 | Great Britain | of 1909 |